July 27, 1937.   T. BODDE   2,087,943

TRACK CIRCUIT FOR RAILROADS

Filed July 19, 1935

INVENTOR
T. Bodde,
BY Neil D. Preston,
his ATTORNEY

Patented July 27, 1937

2,087,943

UNITED STATES PATENT OFFICE 2,087,943

TRACK CIRCUIT FOR RAILROADS

Theodore Bodde, Peiping, China

Application July 19, 1935, Serial No. 32,277

8 Claims. (Cl. 246—34)

This invention relates to track circuits for railroads, and more particularly to improvements in the electro-responsive means associated with the track circuit so as to be non-responsive or immune to stray direct and alternating currents.

The specific objects and characteristic features and advantages of the invention will be in part apparent and in part pointed out as the description progresses.

Figure 1:
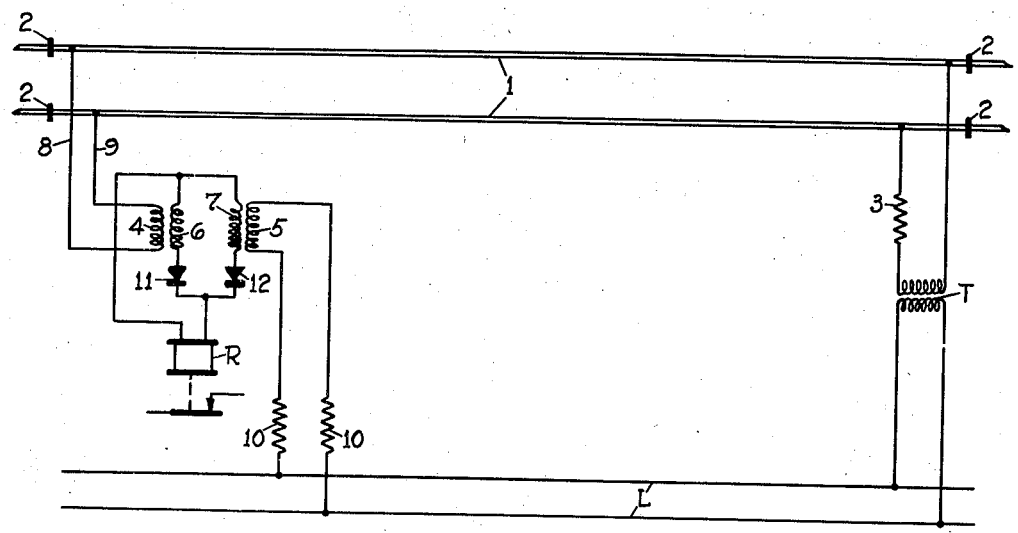
Figure 2:
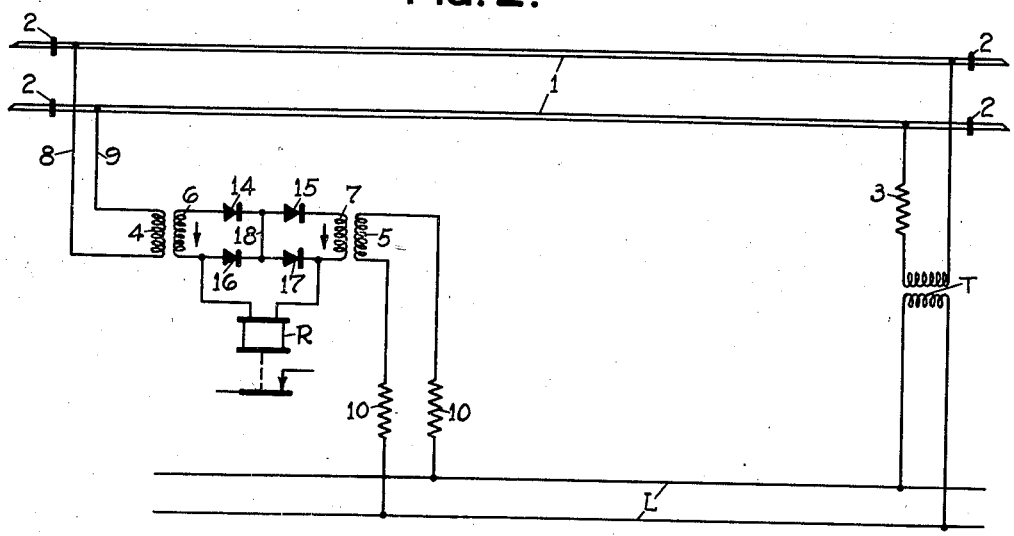

In the accompanying drawing, Fig. 1 illustrates in a simplified and diagrammatic manner one specific organization in accordance with this invention; and Fig. 2 illustrates a modification.

Referring to Fig. 1, it is contemplated that the track rails 1 will be bonded together and divided by insulated joints 2 into track sections in the usual way. In accordance with this invention, the track circuit is supplied with alternating current of a suitable frequency supplied from the line wires L of a transmission line. At one end of the track circuit, preferably the exit end, the secondary of a transformer T is connected across the track rails in series with a suitable limiting impedance 3 in accordance with the usual practice; and the primary of this transformer is connected to the line wires L.

The electro-responsive means of this invention employed to perform the functions of the usual track relay, is arranged to be energized by current from the track rails at the other or entering end of the track section, and also from the alternating current line wires L. In the preferred embodiment of the invention, this electro-responsive means takes the form of a relay R of the usual and well-known construction operable by direct current, together with transformers and rectifiers for supplying to this relay R rectified alternating current from both the track circuit and the transmission line.

In the arrangement shown in Fig. 1, two transformers of suitable construction and having primary windings 4 and 5 and secondary windings 6 and 7, are employed. The primary 4 is connected across the track rails by wires 8 and 9; and the primary 5 of the other transformer is connected across the transmission line wires L in series with suitable impedances 10, preferably adjustable. The secondary windings 6 and 7 are connected in series with rectifiers 11 and 12 of suitable construction, such as the well-known copper-oxide type, said rectifiers being disposed oppositely as shown so as to permit the flow of current in relatively opposite directions. The relay R is connected across the secondary windings 6 and 7 arranged in multiple.

When no train is present, the alternating current in the track circuit flows through the primary 4 and induces a voltage in the secondary 6; and the rectifier 11 in series with this secondary allows current to flow through the relay R for each wave or half cycle of one polarity, say positive. The other primary 5, energized from the transmission line L, also induces a voltage in the secondary 7; and the rectifier 12 in series with this secondary allows current to flow through the relay R on the other negative wave or half cycle. The impedances 10 are selected or adjusted, with due regard to the linear and shunt resistance and reactance of the track circuit, so that the voltages in the secondaries 6 and 7 are substantially 180° out of time phase. In this way, under normal conditions, when the track circuit is not occupied, the relay R is energized with a uni-directional rectified or pulsating current comprising both waves or half cycles of alternating current.

When a train enters the track section, the shunting effect of its wheels and axles reduces the current through the primary 4 in the usual way, thereby decreasing one-half cycle of the current through the relay. This reduces the total energy input to the relay; and also, it is believed, this permits the inherent inductive reactance of the coils of the relay R to be more effective in limiting the current supplied by the voltage induced in the secondary 7 of the other or line transformer, with the result that the current in the relay R is reduced below the drop-away value, and the armature of this relay is retracted to open and close contacts in the usual way.

The track circuit organization of this invention will not be improperly operated by stray direct current in the track rails, since such stray current would merely flow in the primary 4 without inducing any voltage in the secondary 6 to energize the relay R. Likewise, it is very unlikely that stray alternating current in the track rails should energize the relay R improperly, because the primary 4 has to be energized with alternating current of the same frequency and phase relation with respect to the alternating current in the primary as it is normally from the track rails 5, in order to supply sufficient current to the relay R to maintain its armature attracted any other frequency or phase relation not resulting in filling in the blank or off periods of current supplied, by secondary 7, to the relay R. Thus, this invention provides a track circuit which is substantially non-responsive or immune to stray currents in the track rails either direct or alternating.

Fig. 2 illustrates a modification in which the two secondaries 6 and 7 are connected in series with rectifiers 14, 15, 16, 17, and with a cross connection 18 as shown, the relay R being connected across the rectifiers 16 and 17. When the voltages in the two secondaries 6 and 7 are in one direction on one half cycle, as indicated by the arrows, the flow of current through the secondary 6 is blocked by the rectifier 14, but the other secondary 7 may send current through the relay R, rectifier 16, cross connecting wire 18, and rectifier 15. When the voltages in the two secondaries 6 and 7 are in the opposite direction to that assumed and indicated by the arrows, current through the secondary 7 is blocked by the rectifier 15, while the secondary 6 sends current through the rectifier 14, wire 18 and rectifier 17, this current through the relay being in the same direction as before. The principles and mode of operation of this modification of Fig. 2 are the same as already explained.

The specific arrangement and organizations of parts shown and described are merely illustrative of the nature of the invention; and various adaptations, additions, and modifications may be made in the specific embodiments of the invention illustrated without departing from the invention.

What I claim is:—

1. In a track circuit for railroads, a source of alternating current connected across the track rails, a direct current relay having a winding, and means including transformers and rectifiers and two separate circuits for energizing the winding of said relay with half cycles of alternating current having the same polarity from both said source and the track rails.

2. In an alternating current track circuit for railroads, a transformer connected across the track rails, another transformer connected to the same source which energizes the track circuit, a direct current relay having its winding connected to both secondaries of said transformers, and rectifying means associated with said secondaries to supply said relay with half cycles of the same polarity from both transformers.

3. In a track circuit for railroads, a source of alternating current connected across the track rails, a transformer connected across the track rails, another transformer connected to said source, the secondaries of said transformers being connected in series with each other and with oppositely disposed rectifiers, and a direct current relay connected to said secondary circuits and energized with uni-directional current comprising half cycles from each transformer.

4. In a track circuit of the character described, in combination with a source of alternating current supplied to the track rails, transformers connected to said track rails and to said source, a direct current relay with its winding connected to the secondaries of both of said transformers, and rectifiers in the circuits of said secondaries, whereby said relay is energized with unidirectional current comprising half cycles from both transformers.

5. In a track circuit for railroads, in combination with a source of alternating current, means for supplying current from said source to the track rails, a relay coil, and means including rectifiers for supplying to said relay coil half cycles of current in the same direction, but at different times, from both the track rails and said source.

6. In a track circuit for railroads characterized by the energization of the winding of a direct current relay by uni-directional rectified current derived directly from a source of alternating current and also indirectly from said source through the track rails.

7. An alternating current track circuit for railroads comprising, a direct current relay, and means for energizing the winding of said relay with half cycles of current first from the track rails and then from the source energizing the track rails, said half cycles of current flowing through the relay in the same direction.

8. In a track circuit for railroads, in combination, a source of alternating current connected across the track rails, a direct current relay having a winding, and means for energizing the direct current relay winding including transformers and rectifiers so as to energize the relay through separate circuits with half cycles of alternating current having the same polarity from both said source and from the track rails.

THEODORE BODDE.